(No Model.) 4 Sheets—Sheet 1.

J. B. STONER.
AUTOMATIC WEIGHING MACHINE.

No. 480,752. Patented Aug. 16, 1892.

WITNESSES:

INVENTOR
John B. Stoner,
BY
Betts, Atterbury, Hyde & Bill
ATTORNEYS (No Model.) 4 Sheets—Sheet 3.

J. B. STONER.
AUTOMATIC WEIGHING MACHINE.

No. 480,752. Patented Aug. 16, 1892.

WITNESSES:

INVENTOR
John B. Stoner
BY
ATTORNEYS (No Model.)

J. B. STONER.
AUTOMATIC WEIGHING MACHINE.

No. 480,752. Patented Aug. 16, 1892.

WITNESSES:

INVENTOR
John B. Stoner
BY
Betts, Atterbury, Hyde & Betts,
ATTORNEYS.

UNITED STATES PATENT OFFICE.

JOHN B. STONER, OF NEW YORK, N. Y., ASSIGNOR TO FRANCES J. HASBROUCK, OF SAME PLACE.

AUTOMATIC WEIGHING-MACHINE.

SPECIFICATION forming part of Letters Patent No. 480,752, dated August 16, 1892.

Application filed August 26, 1891. Serial No. 403,758. (No model.)

*To all whom it may concern:*

Be it known that I, JOHN B. STONER, a citizen of the United States, residing at New York, in the county of New York and State of New York, have invented certain new and useful Improvements in Automatic Weighing-Machines, of which the following is a specification, reference being had therein to the accompanying drawings.

My invention relates to machines for weighing grain and other materials which comprise a hopper having two compartments for receiving and delivering the grain alternately; and its object is to provide an improved device for automatically weighing the grain as it passes through the hopper.

To this end my invention consists of a balance-beam adapted to weigh the grain contained in the hopper when it has received sufficient to balance the weight upon the other end of said balance-beam, and to quickly swing down with said hopper and return to its former position while the grain is being delivered, and also of certain details of construction in combination therewith hereinafter set forth. I attain these objects by the mechanism illustrated in the accompanying drawings, in which similar letters of reference refer to similar parts throughout the various views.

Figure 1:
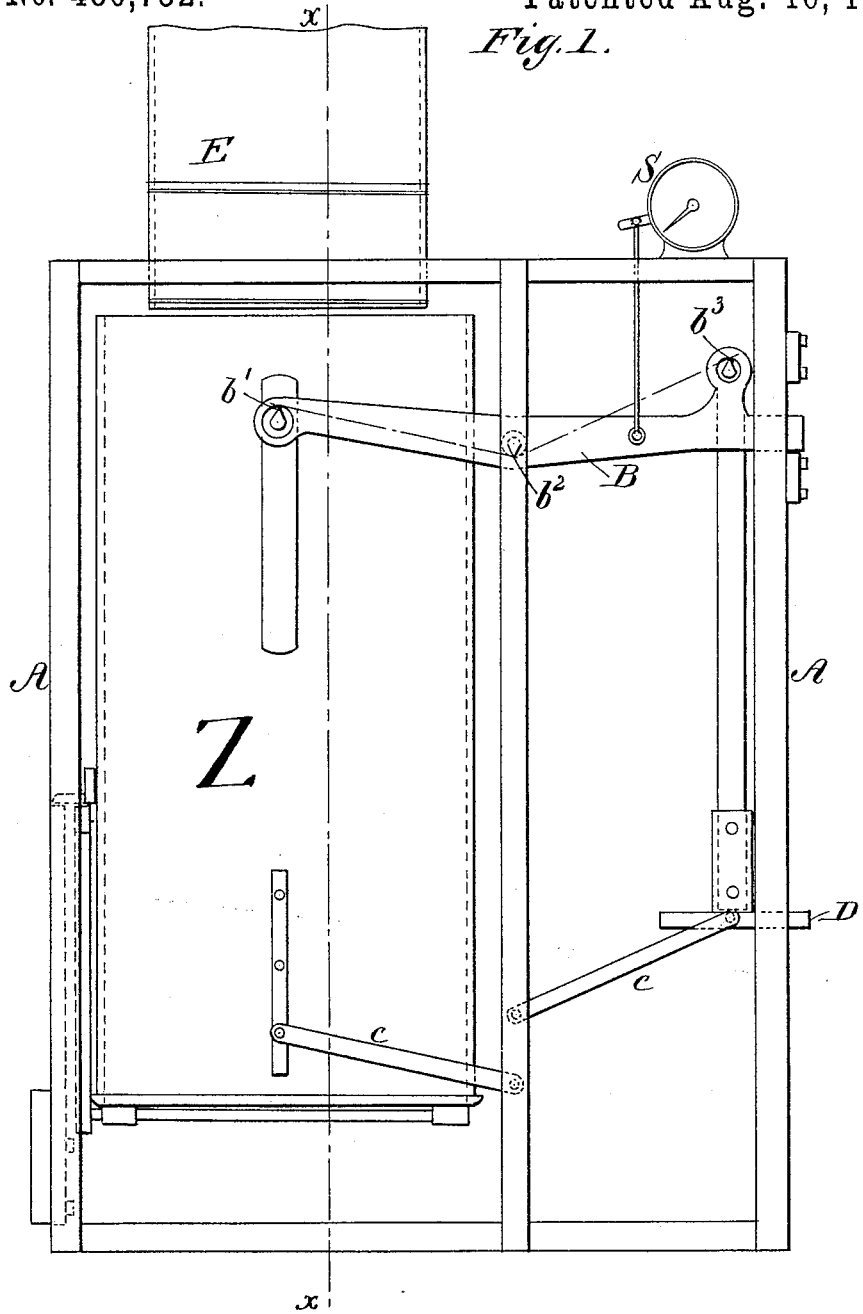
Figure 2:
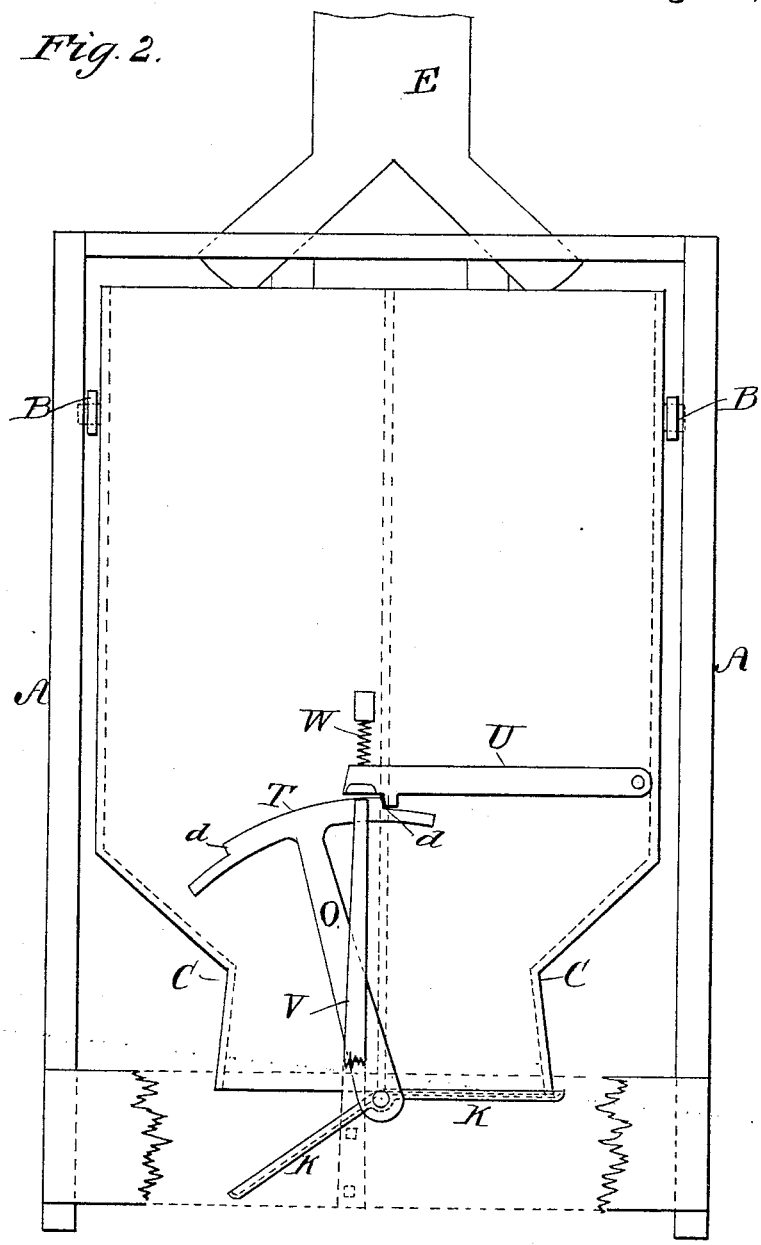
Figure 3:
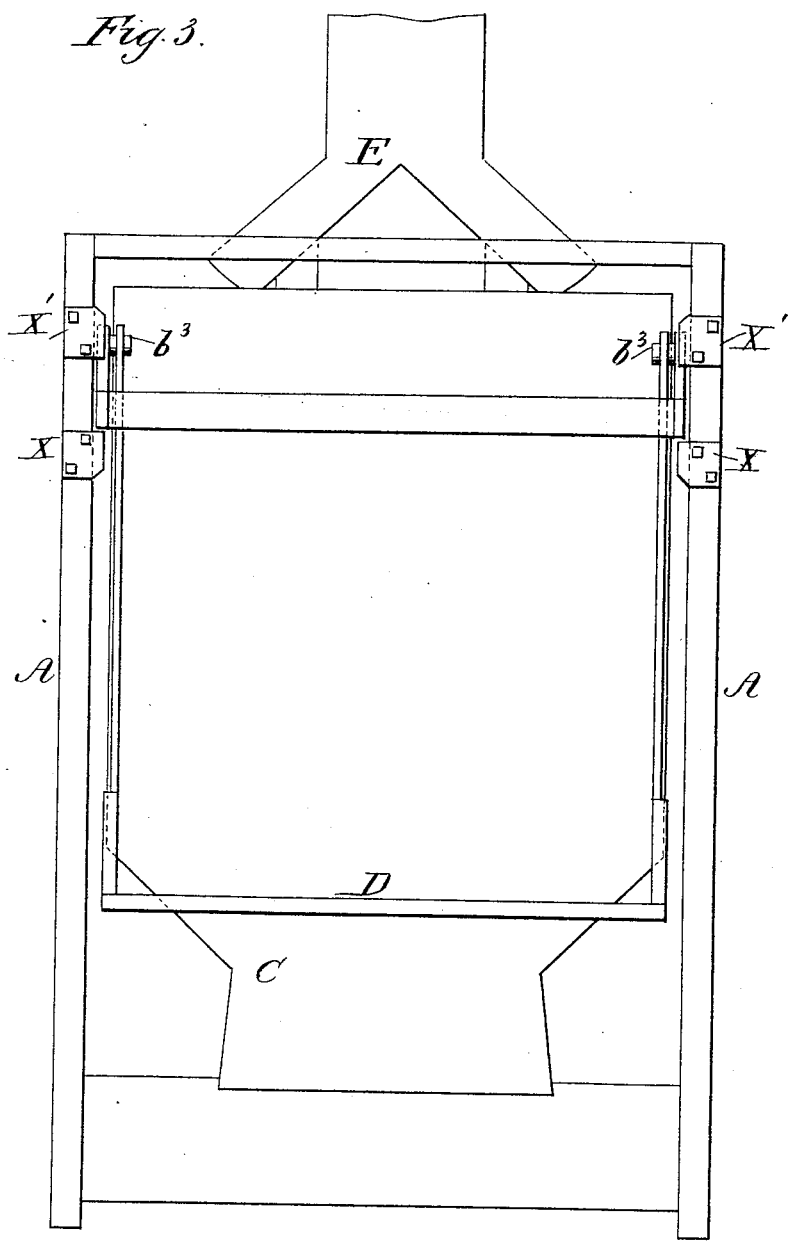
Figure 4:
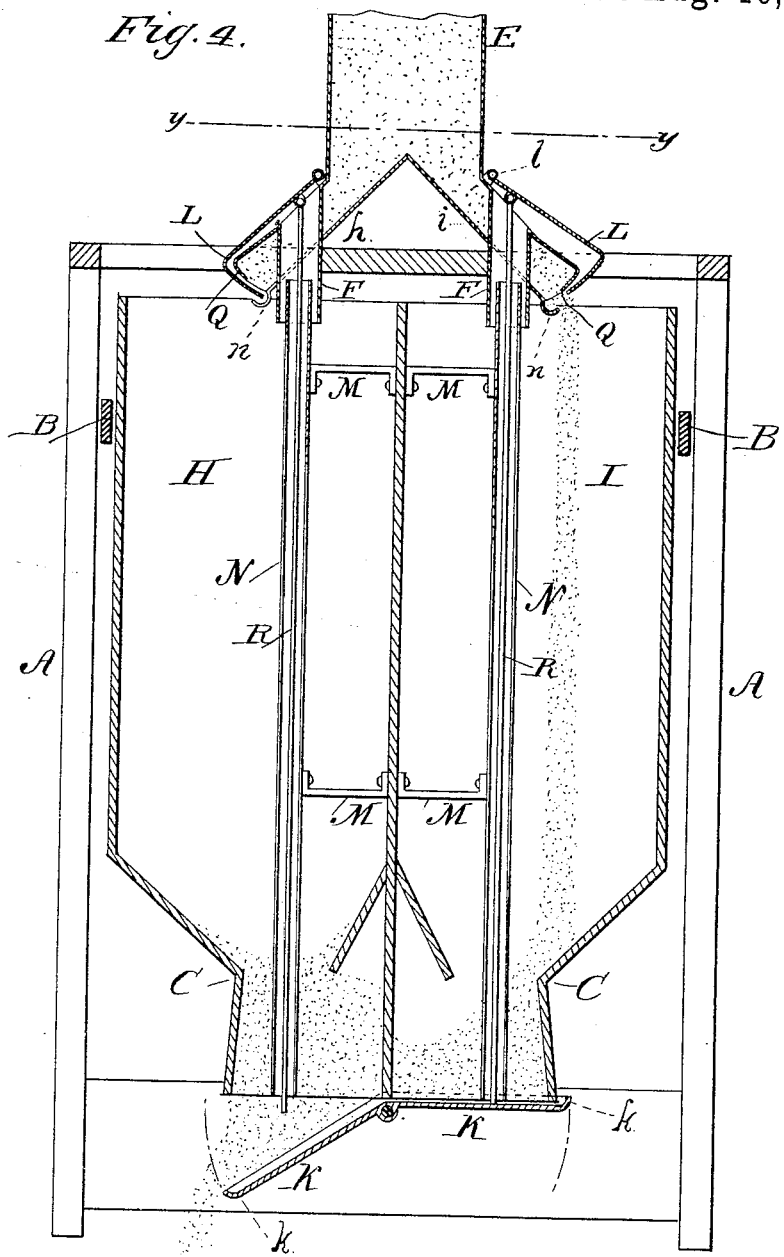
Figure 5:
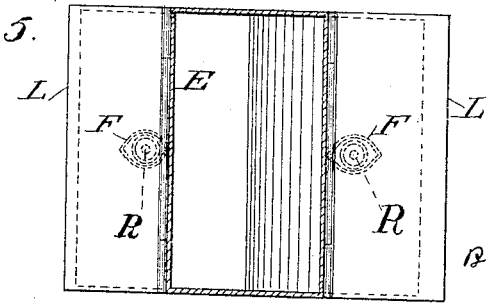

Figure 1 is a side elevation of the machine, showing the balance-beam and the relative position of its knife-edges. Fig. 2 is a front elevation of the machine, showing the device for locking and unlocking the valve or door at the bottom. Fig. 3 is a rear elevation of the machine. Fig. 4 is a vertical section on line *x x* of Fig. 1, showing the device for operating the cut-offs; and Fig. 5, a cross-section on line *y y*, Fig. 4.

A is the frame supporting the balancing-beam B, which carries on one end the hopper Z and on the other end the weight-platform D. The hopper Z is constructed with two compartments H and I and is arranged under chute E, which has two branches *h* and *i*, so that grain coming from one branch of said chute will pass into one compartment of said hopper and grain coming from the other branch of said chute will pass into the other compartment of said hopper. The compartments of said hopper are contracted at C, and below that are enlarged to allow a considerable portion of the grain to pass out suddenly when the valve or door K is opened. The doors K are borne on a rock-shaft journaled on the hopper between the lower openings of the two compartments and are set at such an angle that when one is closed against the discharge-opening of one compartment the other will be open. One of the features of my invention is to construct these doors K with a flange *k* to prevent the grain lodging, so that the door can be shut sufficiently to insure the proper working of the mechanism. The branches *h* and *i* of chute E have cut-offs L, swinging on horizontal axes *l*. Said cut-offs L when closed fit into recesses or grooves *n* on the lower walls of branches *h* and to render the cut-off certain in its action. Cut-offs L are raised and lowered by means of rods R, running through tubes F, which intersect the respective branches of chute E and tubes N, which project into tubes F and pass down through the respective compartments of the hopper, in which they are rigidly supported by braces M. When the door K of one compartment is shut, it raises its rod R and cut-off L, and when said door is opened said rod R and cut-off L descend and prevent the grain from running into that compartment. One of the features of my invention is this device for protecting the mechanism for operating the cut-offs from the grain and dirt. The outlet of the branches of chute E, I contract by means of a plate or flange Q, so that when the cut-off L of a branch is down the weight of the grain will be partially relieved from said cut-off and will not clog the machine by preventing said cut-off from rising. This device is also one of the features of my invention. Attached to the rock-arm which bears the doors K is an arm O, bearing a segment T, having shoulders *d*, adapted to engage with a spring-latch U. Said spring-latch swings on a horizontal axis and is operated, as the hopper rises and falls, by the rod V, attached to the frame A. Pivoted to the frame and to the hopper and weight-platform, and preferably at the same angle as that of the leverage of the respective lever-arms of said balance-beam, are guide-stays *c* to steady the machine. The balance-beam B is provided with knife-edges $b'$ $b^2$ $b^3$. The knife-edge $b^2$ of the fulcrum-point is supported on the frame A. The beam is shaped so that said knife-edge $b^2$ is below the knife-edges $b'$ and $b^3$, bearing the hopper and weight, respectively, and so that knife-edge $b^3$, bearing the weight-platform is higher than knife-edge $b'$, bearing the hopper, the three knife-edges in the position shown in Fig. 1 forming the broken line $b'$ $b^2$ $b^3$. It will be readily understood that as soon as the weight of the grain in the hopper overbalances the weight on the weight-platform the hopper will descend with great rapidity, as its change of position increases its leverage the balance-beam and diminishes that of the weight-platform. The stops X X' on the frame are arranged so that the knife-edge $b'$ can never descend below fulcrum-point $b^2$. Attached to the balance-beam B is any suitable registering device S for registering each time that the amount of grain corresponding to the weight on the weight-platform D is weighed.

The operation of the machine is as follows: The proper weight being on the weight-platform D and the hopper Z being arranged under chute E, as shown in Fig. 1, the grain coming down chute E will pass down branch $i$ and into compartment I until the weight-platform is overbalanced. The hopper will then fall until arrested by stop X'. This fall will be sudden, because as soon as the weight-platform is overbalanced the leverage on the hopper end of the balance-beam is continually increased and the leverage on the weight end of the balance-beam continually diminished. As the hopper falls the stationary rod V will abut against spring-latch U and raise it against the spring W. The weight of the grain will force open the door K and the bulk of grain below the contracted portion C of the compartment will immediately escape and allow the weight to again counterbalance the hopper, which will immediately rise to its former position. As the door K of compartment I is opened, rod R will drop and allow cut-off L of branch I to shut, and at the same time door K of compartment H will be shut, (latch U free from rod V, now that the hopper has risen, holding it shut,) raising rod R and cut-off L of branch $h$, and the grain from chute E will now pass into compartment H and the rest of the grain in compartment I will escape.

What I claim, and desire to secure by Letters Patent, is—

1. In a machine for weighing grain, the combination of, first, a balance-beam bearing on one of its lever-arms a hopper having two compartments, each provided with a door at the bottom for delivering the grain, the door of one compartment adapted to be shut by opening the door of the other; second, a chute having two branches adapted to deliver grain into said compartments, respectively, and third, a device for operating the cut-offs of said branches, which consists of a rod inclosed from the grain and dirt and adapted to be raised by the shutting of said door, substantially as described.

2. In an automatic machine for weighing grain, the combination of, first, a balance-beam having the hopper for the grain supported on a knife-edge on one arm thereof higher than the fulcrum of said beam on the frame of the machine and the weight supported on a knife-edge on the other arm thereof higher than the said first-mentioned knife-edge and said fulcrum-point; second, a hopper having two compartments adapted to receive and deliver grain alternately from a chute having two branches; third, bottom doors for said compartments having flanges; fourth, cut-offs for said branches, consisting of a plate movable transverse to the opening of said chute, and a plate rigid on the wall of said chute toward which said movable plate is moved when said chute is opened, and, fifth, means of automatically opening said bottom door of one compartment and shutting the branch chute feeding the same and shutting said bottom door of the other compartment and opening the branch chute feeding the same, alternately, as the hopper receives the amount of grain to be weighed and drops, substantially as described.

In testimony whereof I affix my signature, in presence of two witnesses, this 25th day of August, 1891.

JOHN B. STONER.

Witnesses:
WM. B. WHITNEY,
H. V. N. PHILIP.